United States Patent [19]

Tormakhov et al.

[11] Patent Number: 5,277,383

[45] Date of Patent: Jan. 11, 1994

[54] AMPHIBIAN AIRCRAFT

[76] Inventors: Alexei J. Tormakhov, 5 Voikovsky proezd, 14 kv. 39, Moscow, U.S.S.R.; Georgius Prodromou, ulitsa Demetri Liperti, 13, Lakatamiya, Nicosia, Cyprus

[21] Appl. No.: 895,750

[22] Filed: Jun. 9, 1992

Related U.S. Application Data

[63] Continuation-in-part of Ser. No. 895,319, Jun. 8, 1992, abandoned.

[30] Foreign Application Priority Data

Jun. 7, 1991 [SU] U.S.S.R. .............................. 4940184

[51] Int. Cl.⁵ .............................................. B64C 35/00
[52] U.S. Cl. ...................................... 244/106; 244/105
[58] Field of Search .................... 244/106, 105, 101; 114/292

[56] References Cited

U.S. PATENT DOCUMENTS

| | | | |
|---|---|---|---|
| 1,748,252 | 2/1930 | Sundstedt | 244/105 |
| 3,190,582 | 6/1965 | Lippisch | 244/105 |
| 3,599,903 | 8/1971 | Handbar | 244/105 X |
| 4,962,978 | 10/1990 | Weston | 244/106 |

FOREIGN PATENT DOCUMENTS 3029574A 11/1984 Fed. Rep. of Germany.
0496747 11/1919 France .................................. 244/106

OTHER PUBLICATIONS

Belavin, M. I.: "Air-cushion vehicles" (Ground-Effect Aircraft) 2nd Edition, Sudostroenie Publishing House, Leningrad, 1977 (with translation).

*Primary Examiner*—Margaret A. Focarino
*Assistant Examiner*—Christopher P. Ellis
*Attorney, Agent, or Firm*—Keck, Mahin & Cate

[57] ABSTRACT

The invention relates to an amphibian aircraft incorporating a hydrodynamic system formed by three floats wherein the first two floats are attached to a fuselage leading portion symmetrically to the aircraft axis and the third float is attached to a fuselage trailing portion along the aircraft axis of symmetry. The distance between the floats renders it possible to place a trailing float out of the zones of the water surface disturbed by hydroplaning leading floats. Moreover, the center of gravity is shifted behind the steps of the bottom of the leading floats to the trailing portion of the fuselage.

6 Claims, 5 Drawing Sheets

AMPHIBIAN AIRCRAFT

This application is a continuation-in-part of TORMAKHOV et al., United States patent application Ser. No. 07/895,319, filed Jun. 8, 1992, now abandoned, entitled "Amphibian Aircraft".

The present invention relates to flying vehicles, and, more particularly, to an amphibian aircraft.

TECHNICAL FIELD

The proposed invention can be advantageously used in the manufacture of an amphibian aircraft and hydroplaning boats, catamarans, and other craft incorporating hydrodynamic system formed by three floats.

PRIOR ART

Amphibian aircraft of various designs are rather widely known.

However, their manufacture and operation are restricted due to the existing problems related to safe water take-off and landing.

One of the problems is the formation of the zones of unstable motion caused by the contact between a trailing portion of the fuselage bottom and the water surface disturbed by leasing floats or by the first step of the airframe when the airframe serves as a float.

Another problem relates to the formation of a high diving moment caused by the location of an aircraft propulsion system high above fuselage or a wing, aimed at the protection of the system from a water spray at the moment of an aircraft water take-off and landing.

Known in the art is an amphibian aircraft which has a float system-mounted fuselage connected with wings and carrying horizontal and vertical tails with an elevator and a rudder. The aircraft is equipped with propellers and retractable landing gears.

The float system of the aircraft comprises streamlined bodies with hydroplaning bottoms attached to the sides and bottom of a fuselage and separated from each other by an open groove running along the full length of a fuselage bottom. Their inward sidewalls form sharp edges in the place of their crossing the bottoms of streamlined bodies (See, for example, N 3029574 West Germany Patent, B640356/02 01, issued 29.11.84).

Such a design does not eliminate the formation of the zones of unstable motion during the aircraft movement along the water surface, which are caused by water spray falling from the steps of the streamlined bodies, thus transferring the disturbance to the bottom of the trailing portion of the aircraft. Owing to the same reason a substantial change of the angles of an aircraft motion in the process of its standing acceleration is observed.

Besides, operation of an aircraft of such a type is not free from the formation of a high diving moment caused by the location of the aircraft propulsion system high above the aircraft centre of gravity.

The most similar to the proposed invention is the design of an amphibian aircraft incorporating a propulsion system, a fuselage, which carries wings, vertical and horizontal tails and has three floats with hydroplaning bottoms in its lower portion, wherein two of which are attached to the leading portion of the fuselage symmetrically to the vertical fore-and-aft plane thereof, and have their inward sidewalls facing each other, and the third one is located in the trailing portion so, that its fore-and-aft axis lies in this plane. (See, for example, "Air-cushion vehicles" by Belavin, M. I., p. 146, Sudostroenie Publishers, 1977). This air-cushion vehicle is equipped with delta-wings having trailing edge with sweepforward. The root of the wing trailing edges serve as the third trailing float.

However, the design of the aircraft is not free from the shortcomings mentioned above.

Operation of the known aircraft is also associated with the formation of the zones of unstable motion caused by the contact of a wing trailing edge with the water surface, disturbed by the leading hydroplaning floats which again results in the changing of the angles of the aircraft motion and adverse effect of the leading hydroplaning floats on the wing trailing edges.

Consequently, the safety of the aircraft operation is reduced and its handling gets complicated.

SUMMARY OF THE INVENTION

The main object of the present invention is the creation of an amphibian aircraft which, during water take off and landing, would be free from the formation of the zones of unstable motion under all the modes of the propulsion system operation and in case of the pilot's error in water operations.

It is a further object of the present invention to create an amphibian aircraft having the centre of gravity so located as to eliminate the formation of a diving moment during its take-off and landing.

It is another object of invention to improve the safety of an aircraft operation and to make its handling easier.

These objects are attained in the proposed amphibian aircraft, comprising a propulsion system, a fuselage which carries wings, vertical and horizontal tails and has three floats with hydroplaning bottoms in its lower portion of which the first two floats are attached to the leading portion of said fuselage symmetrically to its vertical fore-and-aft plane, which their inward sidewalls located from each other at a distance of more than one and a half width of one of the float bottoms, while the third one is attached to the trailing portion so, that its fore-and-aft axis lies in the symmetry plane of the fuselage and this third float is out of the water surface zones disturbed by the first two floats, the aircraft centre of gravity being located behind the steps of said first two floats.

In the preferred embodiment of the invention it is reasonable to provide the distance along the fore-and-aft axis between the step of the third float and those of the first two floats of no less than 6-fold width of a front float bottom and to place the aircraft centre of gravity at the distance of more than 0.3–0.5 float bottom width from the steps of the first two floats.

In one case the inward sidewalls of the first two floats may be located vertically.

In another case said inward sidewalls may be inclined. However, the inclination angle of a sidewall should not exceed 10 degrees.

BRIEF DESCRIPTION OF THE DRAWINGS

Other features of the proposed amphibian aircraft will become more apparent from the particular description of the invention and the appended drawings wherein.

DESCRIPTION OF THE EMBODIMENTS

Figure 1:
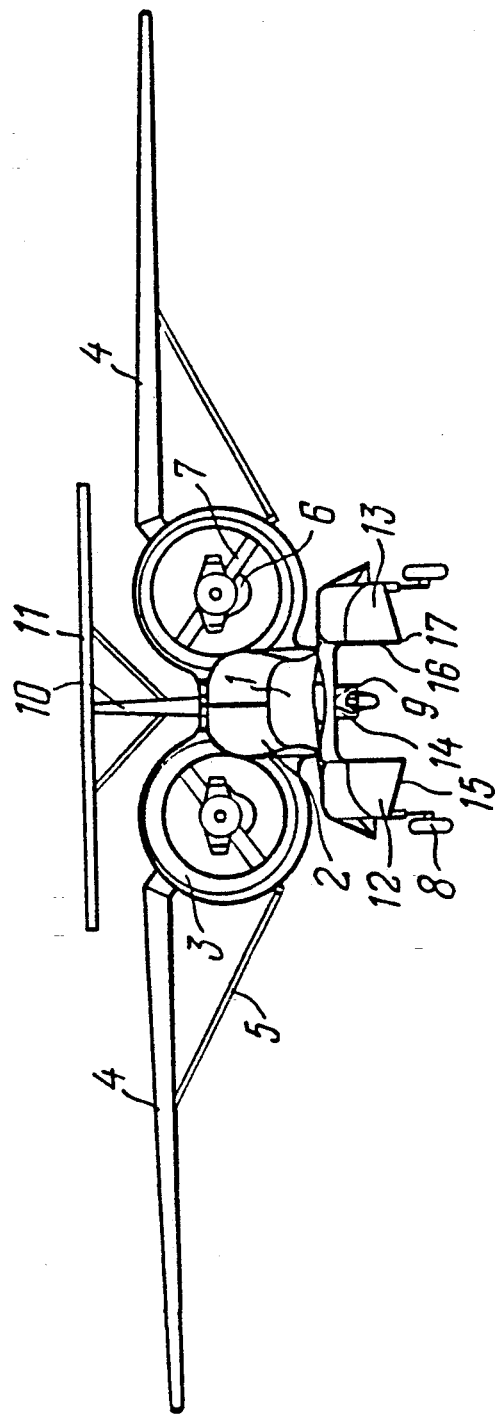
FIG. 1 shows a front view of an aircraft according to the proposed invention.

As it is shown in FIG. 1 an aircraft comprises an elongated fuselage indicated at 1 with a cabin 2 and annular shrouds 3 rigidly attached to the sides of a fuselage 1 and connected with wings 4 directly in their upper portion and by way of the drag struts 5 in their lower portion. Installed inside the annular shrouds 3 are engines 6 adapted for driving propellers 7. Engines 6 and propellers 7 form a propulsion system, which in conjunction with the wings 4 provides lifting of an aircraft.

Annular shrouds 3 are mainly designed for the protection of the propulsion system from water sprays produced by the aircraft hydroplaning on the water surface.

The aircraft is equipped with retractable landing gears 8 and 9 of the known design attached beneath the fuselage 1 nose and tail, respectively.

Mounted on the trailing portion of the fuselage 1 are a vertical tail 10 and a horizontal tail 11, whereas fitted to the fuselage bottom is an arrangement of three floats 12, 13 and 14 with hydroplaning bottoms providing for the aircraft floating and movement along the water surface. Floats 12 and 13 comprise vertical or inclined (not exceeding 10°) inward sidewalls 15 which form sharp edges 17 at the point of their intersection with hydroplaning bottoms 16.

Figure 2:
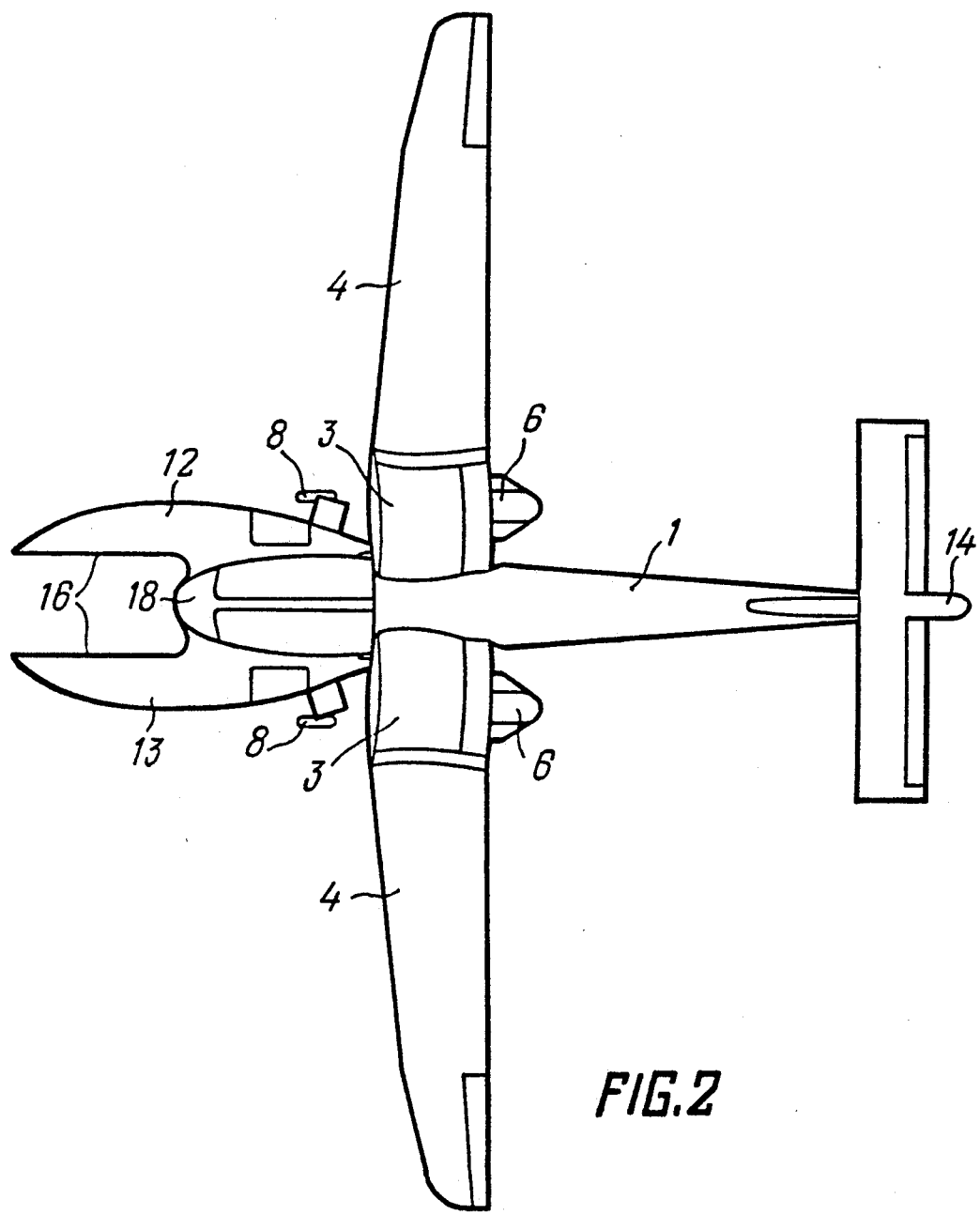
FIG. 2 is a plan view of said amphibian aircraft.

FIG. 2 shows, that two leading floats 12 and 13 of a similar design for example, of a pontoon type, are located in front of a nose 18 of the fuselage 1 and arranged symmetrically to its vertical fore-and aft plane. The trailing float 14 being also of a pontoon type, is installed in a fuselage 1 trailing portion so that the fore-and-aft axis of this float 14 lies in the vertical fore-and-aft plane of the fuselage 1.

The length of the leading floats 12 and 13 slightly exceeds the length of the trailing float 14. For example, if the length of the floats 12 and 13 equals to 4.5 m, that of the trailing float 14 is nearly 3.5 m.

The trailing float 14 is of a smaller cross-section as compared to those of the leading floats 12 and 13 and consists of a streamlined body resembling a triangle with rounded corners.

Said leading floats 12 and 13 together with the trailing float 14 form three points of support, providing, as it was mentioned above, the aircraft floatability with the engines 6 and propellers 7 shut-off and the motion terminated.

Figure 3:
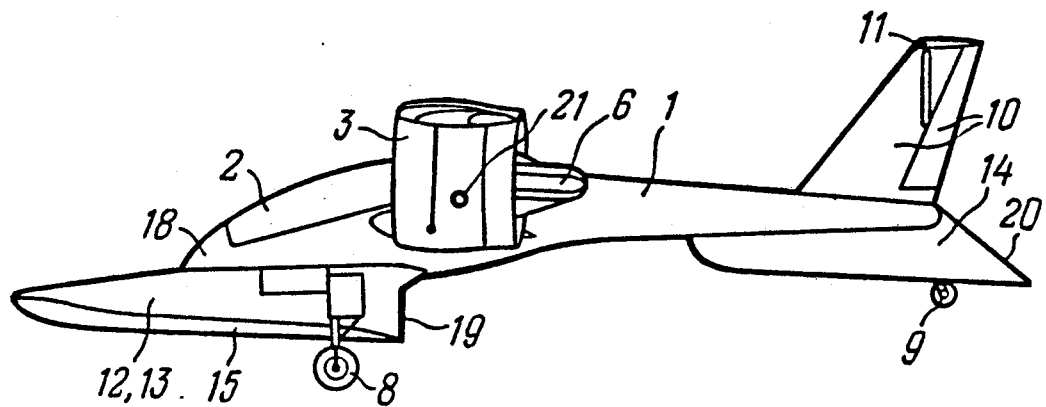
FIG. 3 is a side view of said amphibian aircraft.

As it is shown in FIG. 3 the leading floats 12 and 13 are equipped with a step 19 attached to the end of a hydroplaning bottom 16, and the trailing float 14 has a step 20 which serves for cutting water sprays streamlining the hydroplaning bottoms 16 of said floats 12, 13 and 14.

One of the most important features of the proposed structural arrangement of the aircraft is the location of its centre 21 of gravity which should be shifted according to the invention to the trailing portion of the fuselage 1 behind the arbitrary line connecting the steps 19 of the leading floats 12 and 13. This shift is taken within the limits of 0.3-0.5 bottom width of one of the floats 12 or 13.

In this case the formation of a diving moment from the leading floats in the course of speed acceleration is eliminated, and high stability of the angles of movement at the moment of water lift-off and landing is achieved.

Figure 4:
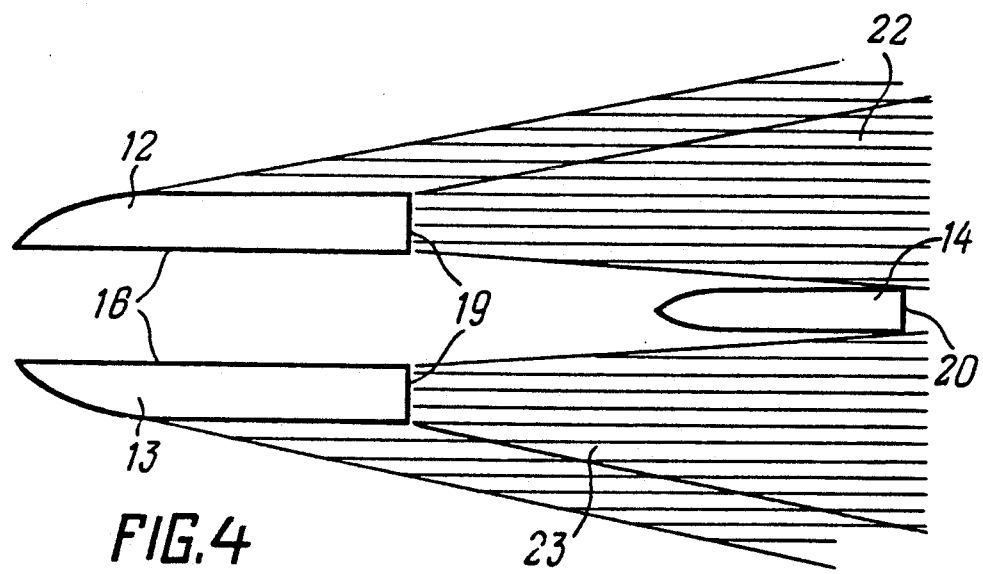
FIG. 4 shows the general arrangement of leading and trailing floats of the aircraft.

To eliminate the formation of the zones of unstable motion of aircraft in the mode of hydroplaning it is necessary to follow the proportions of the parameters established for the arrangement of the floats 12, 13 and 14, schematically shown in FIG. 4.

According to the invention, the distance between the sidewalls 15 of the floats 12 and 13 should be not less than 1.5 the bottom 16 width of the leading float 12 or 13, and the distance between the step 20 of the trailing float 14 along the fore-and-aft axis and the step 19 of the leading floats 12 and 13 should be not less than 6-fold bottom 16 width of the leading float 12 or 13.

With these proportion for the distance between the floats 12, 13 and the trailing float 14, in case of the aircraft hydroplaning, i.e. if the speed exceeds that corresponding to the maximum hydrodynamic resistance, the trailing float 14 will be out of the zones 22 and 23 of the water surface disturbed by the floats 12 and 13, and in case of floating speed, i.e. before the hydroplaning is initiated, the trailing float 14 provides negligible changing of the angles of the aircraft movement.

Figure 5A:
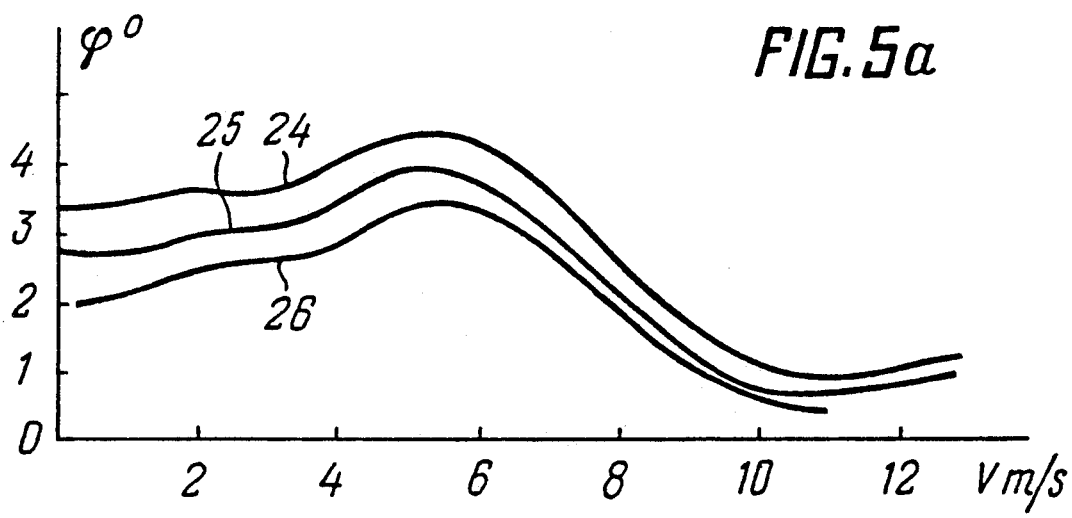
FIG. 5 (a,b) are respectively the diagrams illustrating the main hydrodynamic characteristics of the aircraft obtained in the course of the tests of a model with similar dynamic properties.
Figure 5B:
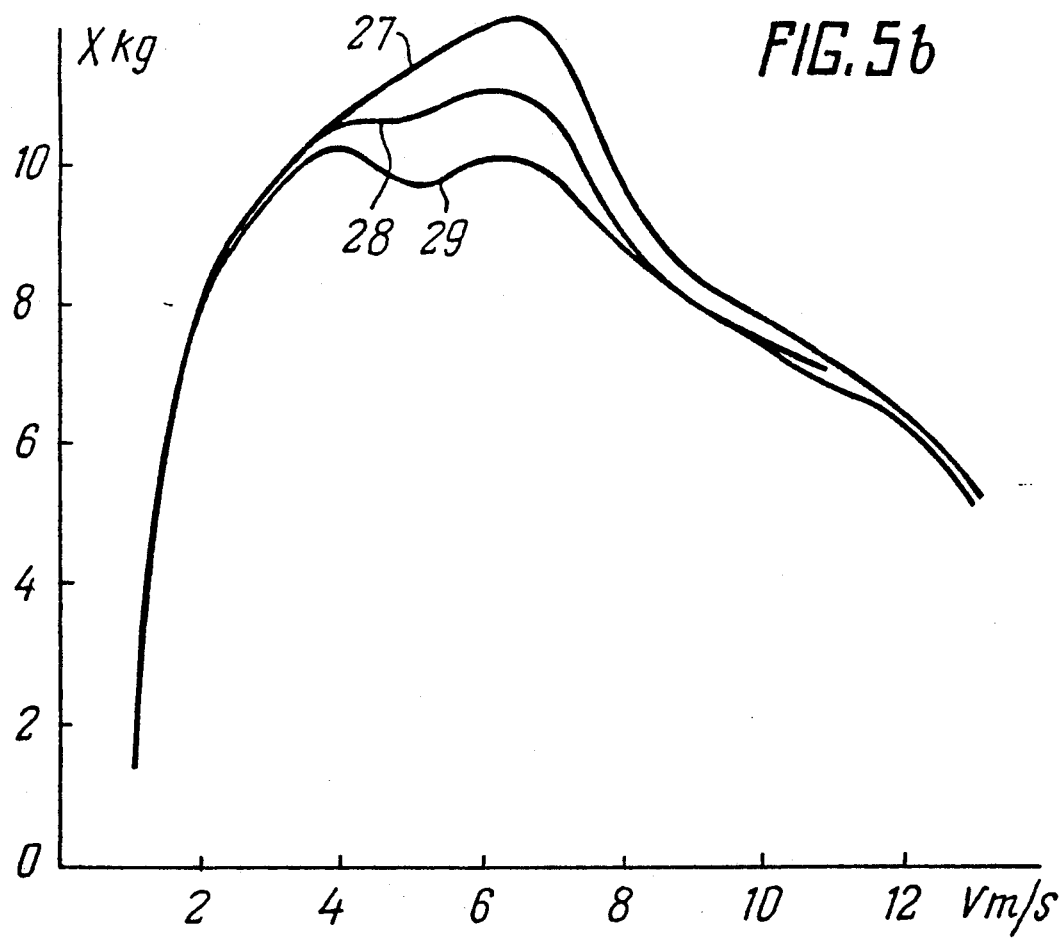

The tests of an amphibian aircraft model made to 1:3 scale has revealed a number of advantages of the proposed aircraft, illustrated by the diagram in FIG. 5 (a,b).

The diagram "a" illustrates the dependence of the angles $\phi$ of movement measured in degrees (axis of ordinates) upon the speed V of the aircraft model measured in meters per second (axis of abscissas) using curves 24, 25 and 26, where the curve 24 is related to the motion with the moment applied to the trailing portion of the model, the curve 25, to the motion with a zero-moment, and the curve 26, to the motion with the moment applied to the nose portion of the model.

The curves were obtained for a 52 kg. model and the values of the moments applied to the nose and to the trailing portion of the model being 4.5 kg m and 4.13 kg m respectively.

The diagram shows, that the range of the angles of movement under such values of the moments covers only one degree, while that for the known amphibian aircraft could be 5-6 degrees with the same weight of the model of 52 kg and the same values of the moments applied to the nose and trailing portion of the model.

The diagram "b" shows the dependence of the tractive resistance X measured in kilograms (axis of ordinates) upon the speed V of the model measured in meters per second (axis of abscissas).

Curves 27, 28 and 29 show the change in the tractive resistance under the above mentioned values of the moments applied to the trailing portion of the model, nose portion of a model and a zero-moment.

Comparing the above mentioned diagrams one can see, that the lower is the angle $\phi$ of movement, (as it should be according to the theory of hydroplaning) the lower becomes the tractive resistance X; that is why the angles of hydroplaning in the proposed model were decreased to 3-4 degrees owing to the support of the trailing float.

A further decrease of the angles $\phi$ of movement could result in the danger of reaching a lower limit of the zone of unstable motion of the model.

Figure 6B:
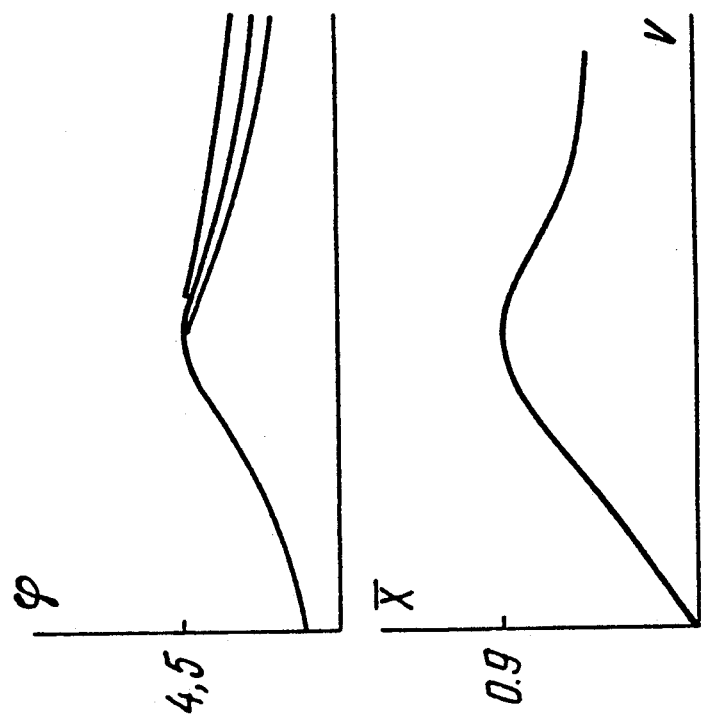
FIG. 6 (a,b) show hydrodynamic characteristics diagrams for the known type of an amphibian aircraft and for the one according to the invention.
Figure 6A:
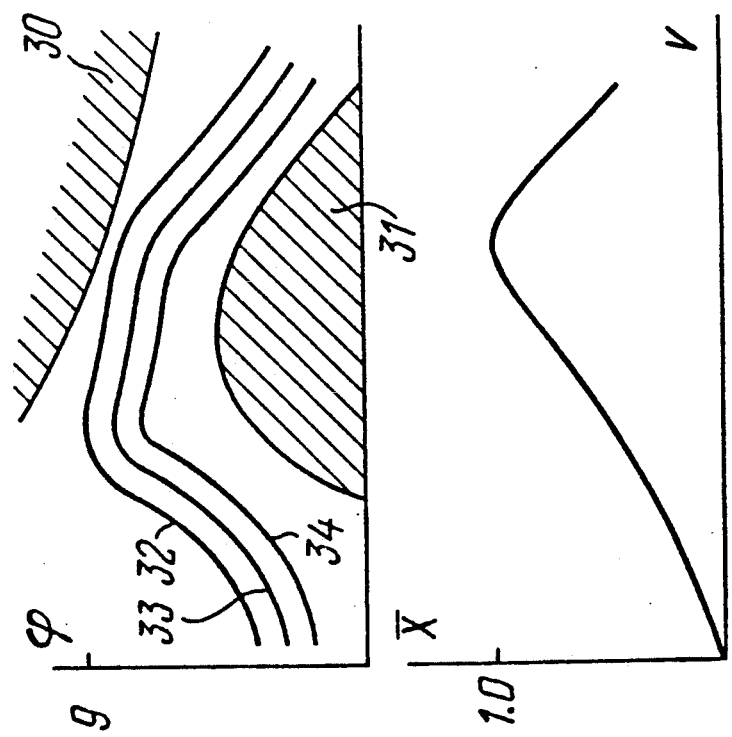

It is proved by the diagrams in FIG. 6 where "a" curves show the dependence of the angles $\phi$ of movement and resistance X upon the speed V of the movement for the known types of amphibian aircraft, and "b" curves show the same dependence for the proposed amphibian aircraft incorporating a hydrodynamic support system consisting of three floats.

Curves "a" show an upper 3 zone 30 and a lower zone 31 of unstable motion of the aircraft, and one can see, that in applying the moment to the nose and trailing portions of the aircraft the curves 32, 33 and 34, illustrating the dependence of the angles of movement upon the speed V, are nearing the zones 30 and 31.

At the same time "b" curves for the aircraft incorporating a three-float system show the decrease of the actual values for the angles $\phi$ of movement provided by the system, moreover, it is possible to decrease the range of the angles $\phi$ of movement while applying various moments and to eliminate dangerous zones of unstable motion of the aircraft.

Since the angle $\phi$ of movement for the proposed aircraft is lower, a certain decrease (see the lower "b" curve) of the tractive resistance X was attained. Noteworthy, for the aircraft according to the invention the maximum traction resistance X is at the lowest speed V, which is very important, as any engine thrust decreases with the speed increased.

The implementation of the present invention results in the possibility of the creation of an amphibian aircraft wherein the formation of the zones of unstable motion and of the diving moment is eliminated under all the modes of angle operation.

We claim:

1. An amphibian aircraft comprising: a fuselage, wings connected with said fuselage, vertical and horizontal tails in the trailing portion of said fuselage; a propulsion system which in conjunction with said wings form lift-producing means; three floats with hydroplaning bottoms equipped with steps located in the lower portion of said fuselage and adapted to provide the floatability of said aircraft when it is on a water surface; the first two of said floats installed in the leading portion of said fuselage symmetrically to its vertical fore-and-aft plane and having inward sidewalls placed from each other at a distance of more than one and a half the width of the bottom of one of said floats; the third float located in the trailing portion of said fuselage so, that is fore-and-aft axis lies in the symmetry plane of said fuselage, said third float being out of the zones of the water surface disturbed by said two first floats during the aircraft movement along the water surface; said aircraft having its centre of gravity shifted behind the steps of the bottoms of said first two floats to the trailing portion of said fuselage.

2. An amphibian aircraft according to claim 1, wherein the distance between the bottom step of said third float in the trailing portion of said fuselage and the bottom steps of said two first floats in the leading portion of said fuselage along the fore-and-aft axis is more than 6-fold the width of the bottom of one of said two first floats.

3. An amphibian aircraft according to claim 1, in which said inward sidewalls of said two first floats are located vertically.

4. An amphibian aircraft according to claim 1, in which said inward sidewalls of said two first floats are inclined.

5. An amphibian aircraft comprising: a fuselage, wings connected with said fuselage; vertical and horizontal tails in the trailing portion of said fuselage; a propulsion system which in conjunction with said wings provides said aircraft lifting; three floats with hydroplaning bottoms equipped with steps, located in the lower portion of said fuselage and designed to provide the floatability of said aircraft when it is on a water surface; the first two of said floats located in the leading portion of said fuselage and being symmetric to its vertical fore-and-aft plane and having inward sidewalls located from each other at a distance of more than one and a half the width of the bottom of one of said two floats; the third of said floats located in the trailing portion of said fuselage so that the fore-and-aft axis of this float lies in the symmetry plane of said fuselage, and this float is located out of the zone of the water surface disturbed by said two first floats during the aircraft motion along the water surface; and said aircraft with its centre of gravity shifted behind the steps of the bottoms of said two first floats to the trailing portion of said fuselage to a distance of more than 0.3-0.5 the width of the bottom of one of said first two floats.

6. An amphibian aircraft according to claim 4 in which the angle of an incline of said inward sidewalls of said first two floats is less than ten degrees.

* * * * *